(12) United States Patent
Bucko et al.

(10) Patent No.: US 9,695,078 B2
(45) Date of Patent: Jul. 4, 2017

(54) HIGH-TEMPERATURE ROLL (71) Applicant: VESUVIUS CRUCIBLE COMPANY, Wilmington, DE (US)

(72) Inventors: Dwayne Bucko, Sewickley, PA (US); Joseph Nardone, Ellwood City, PA (US); Douglas Schlack, Beaver Falls, PA (US); Ryan Elliott, Pittsburgh, PA (US)

(73) Assignee: VESUVIUS CRUCIBLE COMPANY, Wilmington, DE (US)

( * ) Notice: Subject to any disclaimer, the term of this patent is extended or adjusted under 35 U.S.C. 154(b) by 0 days.

(21) Appl. No.: 14/718,182

(22) Filed: May 21, 2015

(65) Prior Publication Data
US 2015/0251942 A1 Sep. 10, 2015

Related U.S. Application Data (63) Continuation of application No. 12/663,629, filed as application No. PCT/US2008/067070 on Jun. 10, 2008, now abandoned.

(60) Provisional application No. 60/934,983, filed on Jun. 15, 2007.

(51) Int. Cl.
 *C03B 13/16* (2006.01)
 *C03B 17/06* (2006.01)
 *C03B 35/16* (2006.01)
 *C03B 35/18* (2006.01)

(52) U.S. Cl.
 CPC .......... *C03B 17/068* (2013.01); *C03B 35/181* (2013.01); *C03B 35/183* (2013.01); *C03B 35/184* (2013.01); *C03B 35/186* (2013.01)

(58) Field of Classification Search
 CPC ....... C03B 13/16; C03B 17/068; C03B 35/16; C03B 35/162
 See application file for complete search history.

(56) References Cited

U.S. PATENT DOCUMENTS

| 1,392,626 | A | * | 10/1921 | Cox | ........................ C03B 13/16 |
| | | | | | 165/89 |
| 2,300,528 | A | * | 11/1942 | Sherts | ..................... C03B 13/16 |
| | | | | | 165/89 |
| 3,116,053 | A | | 12/1963 | Ericsson | |
| 4,139,359 | A | | 2/1979 | Johnson et al. | |
| 4,242,782 | A | | 1/1981 | Hanneken et al. | |

(Continued)

FOREIGN PATENT DOCUMENTS

| JP | 63-011620 A | 1/1988 |
| JP | 04-226211 A | 8/1992 |

(Continued)

*Primary Examiner* — Cynthia Szewczyk
(74) *Attorney, Agent, or Firm* — Thomas Clinton; Donald M. Satina (57) ABSTRACT

A roll for use in glass manufacture, such as in the production of non-dusting TFT glass, includes a hollow silica cylinder. A rod extends through the interior of the silica cylinder. A cooling volume is contained within the cylinder and extends around the rod. End caps are mechanically fixed to the roll. Pulling flats are fixed in place by inner and outer end plates. A compression fitting secures at least the outer end plate to the roll. The rod may serve to reinforce the roll and may be secured to the shaft by a plurality of supports. The supports accommodate differences in thermal expansion.

14 Claims, 6 Drawing Sheets

(56) References Cited

U.S. PATENT DOCUMENTS

| | | | |
|---|---|---|---|
| 4,299,018 A | | 11/1981 | Bickerstaff et al. |
| 4,397,673 A | | 8/1983 | Stevens |
| 4,399,598 A | | 8/1983 | Page et al. |
| 4,404,011 A | | 9/1983 | McMaster |
| 4,421,482 A | | 12/1983 | McMaster |
| 5,146,675 A | * | 9/1992 | Ford .................... B65G 39/09 492/47 |
| 5,205,398 A | | 4/1993 | Hart |
| 5,254,112 A | * | 10/1993 | Sinofsky ............ A61B 5/02007 600/439 |
| 5,316,129 A | | 5/1994 | Daily |
| 5,355,996 A | | 10/1994 | Hart |
| 5,378,219 A | | 1/1995 | Hart et al. |
| 5,906,567 A | | 5/1999 | Gautier |
| 6,263,705 B1 | | 7/2001 | Vild |
| 6,620,084 B2 | | 9/2003 | Daily et al. |
| 6,896,646 B2 | | 5/2005 | Kaiser et al. |
| 2002/0065180 A1 | | 5/2002 | Daily et al. |
| 2003/0181302 A1 | | 9/2003 | Kaiser et al. |
| 2005/0212158 A1 | * | 9/2005 | Kaiser .................. C03B 17/068 264/40.5 |
| 2007/0042883 A1 | | 2/2007 | Daily et al. |

FOREIGN PATENT DOCUMENTS

| | | |
|---|---|---|
| JP | 07-109139 A | 4/1995 |
| JP | 2005-520774 A | 7/2005 |
| WO | 2005/105682 A1 | 11/2005 |
| WO | 2006/089716 A1 | 8/2006 |

* cited by examiner

HIGH-TEMPERATURE ROLL

FIELD OF THE INVENTION

The invention relates to a roll for use in the manufacture of glass and particular to pulling rolls for glass to be used in electronic applications.

BACKGROUND OF THE INVENTION

The production of glass sheet often requires rolls for pulling, supporting, and conveying the sheet at elevated temperatures. The glass will often have a temperature in excess of 500° C. and frequently in excess of 650° C. Rolls must be capable of withstanding such operating temperatures for prolonged periods. Failure of the roll in a continuous production process can be very costly in time, manpower, material and lost revenue. The rolls should therefore resist thermally degradation, mechanically erosion, or dimensional changes, and should not negatively affect the glass.

Rolls may support or convey a glass sheet through an annealing or heat treating furnace. Rolls may also flatten, lengthen or otherwise alter the dimensions of the glass. A roll may even generate a pulling force on the glass to control the glass thickness. In any application, the roll should not contaminate the useable surface of the glass or produce an excessive number of onclusions. Onclusions can occur from "dusting" of the roll, that is, when small particles erode from the roll and stick to the glass. Onclusions are more likely to form on hot glass, such as around pulling rolls right out of the furnace.

Rolls may comprise an outer refractory body bonded to an inner metal shaft. The refractory body resists thermal insults and protects the metal shaft from heat. The metal shaft provides mechanical strength to the refractory body. In one such embodiment, a tubular outer refractory body is cemented to a metal shaft. This unitary structure is strong and simple to produce. Although the metal shaft is insulated from the high temperature glass, damage to any part of the roll requires replacement of the entire roll. Repair of only part of the roll is difficult or impossible. Other problems include cracking caused by mismatches in thermal expansion between the metal shaft, the cement, and the refractory body. The metal shaft expands more than the outer refractory body and exerts a tensile stress on the refractory body. Tensile stresses are particularly damaging because the refractory body is commonly a ceramic, and ceramics are typically weak in tension. Water cooling may be used to reduce the temperature of the metal shaft and therefore its expansion. Unfortunately, the fittings necessary for water cooling add additional expense and complexity to the roll.

A popular roll for use in glass manufacture had included a plurality of asbestos fiber discs stacked over a metal shaft. The asbestos discs were laterally compressed to form a rigid outer surface. The erosion-resistance of the surface could even be improved by impregnation with chemicals such as potassium sulfate. Unlike unitary structures, damage to one or several asbestos discs could be repaired by replacing only the damaged discs. Asbestos fiber is resilient and a good insulator, so it both thermally shielded the metal shaft and accommodated any thermal expansion of the metal shaft that might have occurred. Asbestos also had little affinity for glass, so eroded particles did not stick to glass or form onclusions. Of course, the health risks of asbestos prevent its use. Other ceramic fibers have been used in place of asbestos but such fibers are not as refractory, thermally insulating or erosion-resistant, and may share similar health risks. Further, eroded ceramic particles may adhere to the glass, thereby forming onclusions. Silica particles are particularly susceptible to onclusion formation.

Prior art includes rolls that reduce the erodable surface of the roll. Such rolls may comprise a metal shaft having a plurality of refractory collars. This configuration may be useful in those applications, such as pulling rolls, where only a portion of the glass contacts the roll. A large fraction of the metal shaft is left uncovered by a refractory body. Eliminating the refractory body removes a possible source of dusting and onclusions, but the exposed metal shaft is more susceptible to corrosion and dimensional instability when exposed to elevated temperatures, which may exceed 700° C. Corrosion may cause the metal shaft to break or deposit corrosion products on the glass. Dimensional changes in the roll can cause fracture or distortion of the glass. A coating may be applied to the metal shaft to reduce corrosion but the metal shaft still may warp from the high temperatures. The use of corrosion-resistant and more heat-tolerant metals, such as stainless steel, reduces this risk. Of course, this also increases costs and the metal still is substantially less refractory than a ceramic.

Rolls do not necessarily require a metal shaft for mechanical support. Prior art includes roll comprising a solid fused silica cylinder. Fused silica inherently has a very low coefficient of thermal expansion and has been used where thermal gradients are severe. Fused silica rolls do not corrode and are more dimensionally stable than rolls including metal shafts. Negatively, fused silica rolls do not grip glass sufficiently to function as pulling rolls, lack the strength of metal-shafted rolls, and cannot be directly connected to machinery for driving the rotation of the roll. Metal end caps, which are fixedly secured to the roll, permit mechanical connection to the driving machinery, but are not without their problems. The metal-capped ends must engage the driving machinery and transmit torque to the roll. Problems include securing the end caps permanently to the ceramic roll and loss of torque between the end cap and the roll. Thermal expansion disparities between the ceramic roll and the metal end cap contribute to both problems.

A need exists for a high temperature roll that overcomes the limitations of the prior art. The roll should be substantially non-dusting and should be suitable for use so as a pulling roll. The roll should possess good mechanical strength and accommodate any thermal expansion disparities between the materials. The roll should also possess excellent dimensional stability.

SUMMARY OF THE INVENTION

The present invention describes a roll for pulling a glass sheet particularly in draw down applications. The roll comprises a refractory ceramic shaft supporting a plurality of pulling flats. The shaft may be hollow or solid. The pulling flats are one or more annular discs comprising a substantially non-dusting material and are secured to the outer surface of the ceramic shaft. The non-dusting material may include a compressible or an incompressible material. The pulling flats are secured to the shaft by retainers and optionally a refractory adhesive. The retainer may comprise a split ring.

In one aspect, the pulling roll includes a body comprising a hollow cylinder. The cylinder may comprise fused silica. The hollow cylinder permits the introduction of cooling air into the body. The cylinder includes a longitudinal axis, an outer surface, and opposite ends. End caps are fixedly secured to the ends and are capable of connecting with a driving mechanism that rotates the roll. At least two pulling flats comprise a non-dusting material that is substantially free of colloidal silica or silica fiber. Convective currents may fluidize silica, which can then deposit on the glass to form onclusions. The pulling flats are fixed to the outer surface of the cylinder by a plurality of retainers.

In another aspect, the pulling roll includes a hollow body that is substantially cylindrical. The body comprises fused silica or other non-dusting, rigid refractory ceramic. The cylinder includes a longitudinal axis, an outer surface, an inner surface, and opposite ends. End caps are fixedly secured to the ends and are capable of connecting with a driving mechanism that rotates the roll. Pulling flats are fixed on the outer surface by retainers comprising split rings. A metal rod extends through the hollow cylinder and is secured to the cylinder by compressible supports. The supports accommodate differences in thermal expansion between the metal rod and ceramic cylinder so that thermal expansion of the rod does not exert an undue tensile stress on the body. The rod provides a fail-safe in the event the body breaks.

In one embodiment, the pulling roll includes a hollow body comprising fused amorphous silica and a pair of pulling flats fixed in place by retainers. The retainers include outer and inner end plates. Each pulling flat is near an end of the body and includes an outer circumference that extends beyond the end plates. The outer and inner end plates comprise a rigid, non-dusting, refractory material. Each inner end plate includes an outer diameter that is less than the outer diameter of the pulling flat. The inner end plate abuts an abutment of the body. The abutment may be molded or machined into the body or may be fixed to the body using mechanical fasteners or adhesives. Each outer end plate includes an outer diameter that is less than the outer diameter of the pulling flat. Each outer end plate also includes an inner diameter that increases towards the end of the roll. An outer retaining ring, having a wedge-shaped cross-section that complements the increasing diameter of the outer end plate, is forced at least partially between the inner diameter of the outer end plate and the body until the outer end plate is frictionally fixed to the roll. In this manner, the pulling flat is rigidly sandwiched between the end plates and the end plates are capable of providing support for the pulling flat during service.

In a second embodiment, the outer retaining ring comprises a plurality of portions and the body includes recesses having discontinuities. The portions have a substantially wedge-shaped cross-section and a face that complements the inner diameter of the outer end plate. The recesses are beneath the outer end plates. The recesses may be continuous or discontinuous around the body. The portions are forced between the outer end plate and the body until the engage the recess. The discontinuity of the recess restricts motion of the portion.

Materials other than silica that may be used in the body of the pulling roll of the invention include mullite, aluminum titanate, silicon carbide, or other fused or non-fused materials. A silicoaluminate composition having a low-shot fiber content under 3.5 wt % may be used. Such a composition may have 35-45 wt % alumina and 55-65 wt % silica, with a density in the range from 5-6 kg/m$^3$, such as 5.5 kg/m$^3$. A low shot fiber content may be obtained by blowing a glass molten stream with air. Construction of the body of the roll from a material with a thermal expansion coefficient below $6 \times 10^{-6}$ ° C. reduces thermal expansion disparities.

A silicoaluminate composition, a millboard or a silicoaluminate fiber material may be used for the pulling flats. Such a composition may have 35-45 wt % or 40-42 wt % alumina, 50-60 wt % or 53-56 wt % silica, and 3-6 wt % or 4-5 wt % $B_2O_3$, with a density in the range from 5-10 kg/m$^3$. Other materials that may be used the pulling flats, alone or in combination, include mullite, aluminum titanate, silicon carbide, or other fused or non-fused materials.

DETAILED DESCRIPTION OF THE INVENTION

The invention includes a roll for use in glass manufacturing. More particularly, the roll may be used as a pulling roll and has very little dusting and, therefore, restricts the formation of onclusions on the glass.

Figure 1:
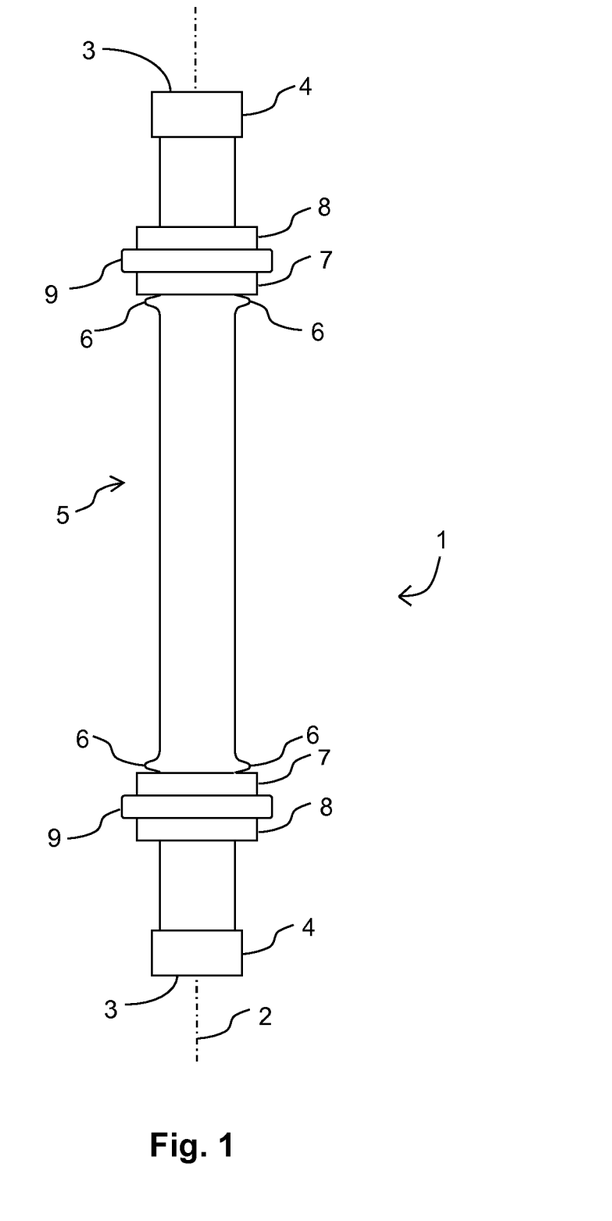
FIG. 1 is a perspective view of a roll of the current invention.
Figure 2:
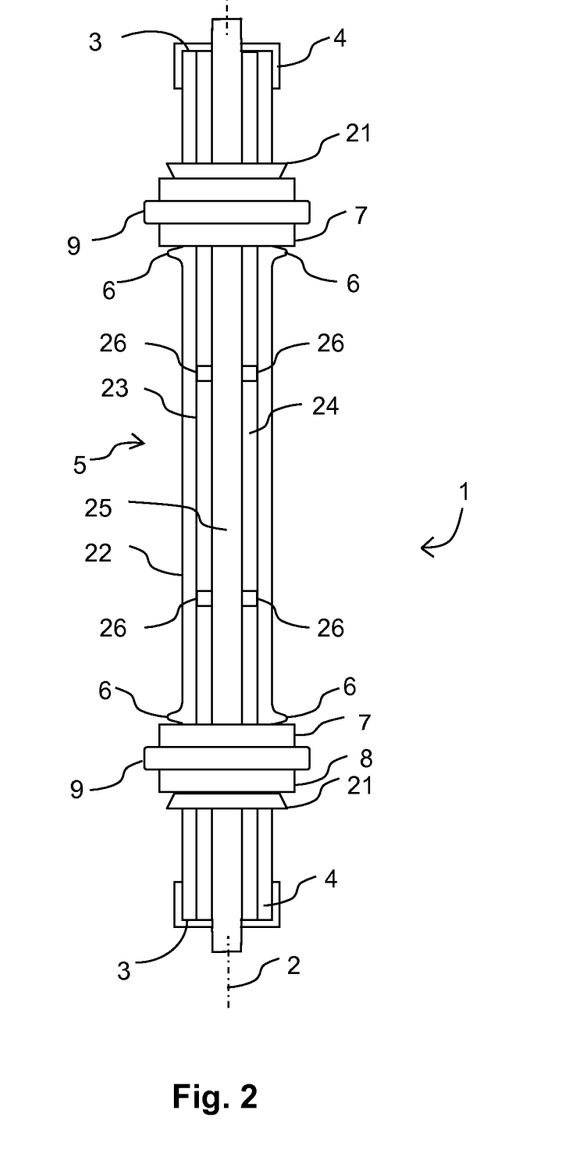
FIG. 2 is a cross-section of the roll.

FIGS. 1 and 2 show a roll 1 of the present invention. The roll 1 includes a longitudinal axis 2 and opposite ends 3. End caps 4 cover each end 3. The body 5 of the roll 1 includes a cylinder comprising a substantially incompressible refractory ceramic, such as fused silica. The body 5 has an outer surface 22 and an inner surface 23. The inner surface 23 defines a cavity 24. The ends 3 may close the cavity 24 but, preferably, the cavity 24 remains open at either end 3. Open ends permits a metal rod 25 to extend through the cavity 24 between the end caps 4. Supports 26 hold the metal rod 25 along the longitudinal axis 2. An inner end plate 7 is adjacent to an inner retainer 6, in this embodiment, an abutment. The abutment 6 is present near each end 3. The inner end plate 7 and an outer end plate 8 sandwich a pulling flat 9. An outer retainer 21 frictionally secures the pulling flat 9 against the outer end plate 8.

The body comprises a substantially incompressible refractory ceramic material such as fused silica and, more preferably, a sintered amorphous silica. The fused silica may be produced by any method. The body should be machined to control concentricity and maintain balance. Preferably, deviation from the ideal is less than about 10 inch-pounds. The body preferably includes a hollow cylinder. The wall of the hollow cylinder will have a thickness sufficient to support the roll during operation and to accommodate the stresses at the end caps. For example, a fused silica roll having a length of four meters should have a wall thickness at least about 15 mm.

End caps fit around the end of the roll. End caps should be metallic and most commonly will be steel. Any known method, including adhesives, set screws, pins and compression fittings, may secure the end caps to the roll. US 2007/0042883 is hereby incorporated by reference. The end caps permit connection of the roll with a drive mechanism. Preferably, the end caps will not obstruct the cavity within the roll so that the flow of cooling air is not obstructed. In one embodiment, the end caps include a metal ferule adapted to fit over the end of the body. Interposed between the end cap and the body is a resilient metal ring having a plurality of circumferentially arranged corrugations as, for example, described in PCT/EP2006/001563 which is hereby incorporated by reference.

Figure 5:
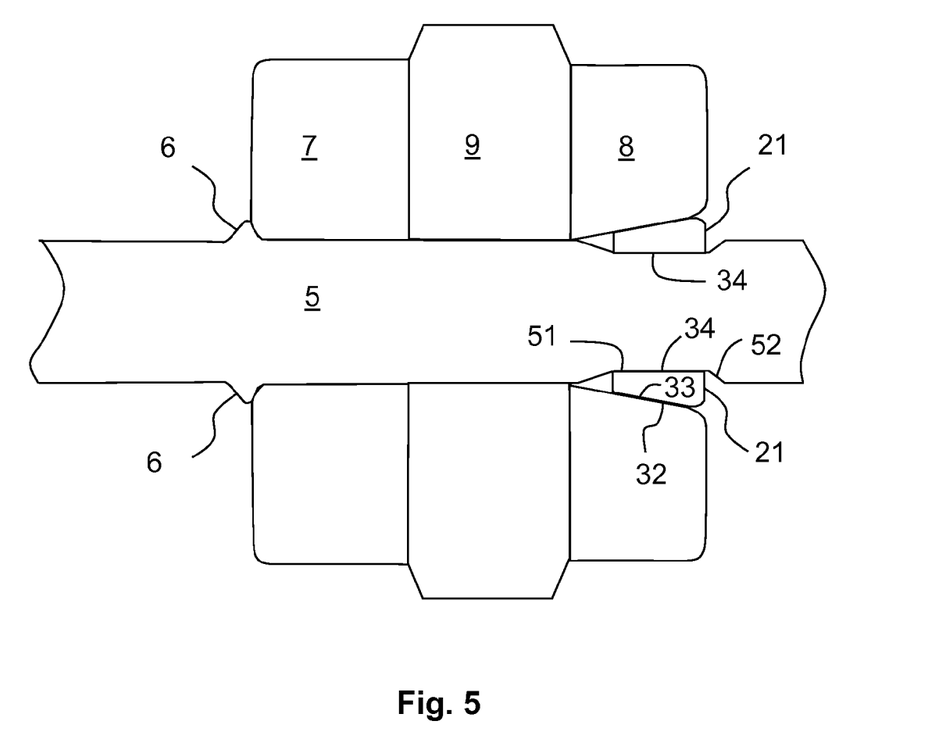
FIG. 5 is a cross-section of the end plate, retainer, and body.

The end plates are substantially discs having an inner diameter at least slightly larger than the diameter of the roll. The inner diameter of the end plates may vary as described below. The end plates should comprise a rigid, refractory, non-dusting material and preferably will also mechanically support the pulling flat. The retainers should exert a force parallel to the longitudinal axis of the body sufficient to properly support the pulling flats. This force is often at least several thousand pounds. The end plates may comprise fused silica or any other non-dusting refractory ceramic. The end plates may be secured to the body by mechanical retainers, such as abutments or retainers, or adhesives. Suitable adhesives may contain colloidal silica that bonds to both the body and the end plate. Alternatively, retainers mechanically fix the end plates to the body of the roll. In one embodiment, the retainer includes a ring comprising a plurality of portions and the body of the roll under the end plate includes a recess to accept the portions thereby locking the end plate in place. As shown in FIG. 5, the body 5 includes a recess 51 with a discontinuity 52. The retainer 21 includes an inclined surface 33 and a second surface 34. The inclined surface 33 complementary engages an inner surface 32 of the outer end plate 8, and the second surface 34 engages the recess 51. The discontinuity 52 holds the retainer 21 in place. The outer retainer may comprise fused silica.

The pulling flat comprises a non-dusting material that is capable of pulling glass. The roll includes a plurality of pulling flats. Generally, the pulling flats produce two contact areas on either edge of the glass sheet; although, the pulling flats may have multiple contacts with the glass. Pulling glass requires the material to have a sufficiently high-temperature compressive strength. A suitable material for the pulling flats may include mica, clay such as for example kaolin, and refractory ceramics such as quartz, alumina, glass, and mullite. Advantageously, mica and clay inherently possess a high specific gravity that resists fluidization by convective currents. Particle size should be high enough to resist fluidization but small enough to produce a smooth pulling flat. Particle shapes that deviate from the spherical, such as elongated or flattened shapes, are less likely to be entrained in a fluid. The pulling flats may have a Shore D hardness value in the range of 25 to 35, and may contain a heat-resistant binder The material may be reinforced with ceramic fiber and/or glass fiber. The fiber preferably comprises low shot content, where shot refers to generally non-fibrous agglomerations produced during fiber manufacture. The fiber reinforces the pulling flat material. Embedding the fiber reduces the likely that fiber will break free and create onclusions. The fiber may include silica, aluminosilicate or other suitable compound.

The pulling flat should rotate with the roll and should not spin relative to the roll. A refractory adhesive, such as colloidal silica or a refractory cement, may secure the pulling flat to the body. Adhesion to the body may be improved by roughening or creating grooves in the outer surface of the body.

Figure 3:
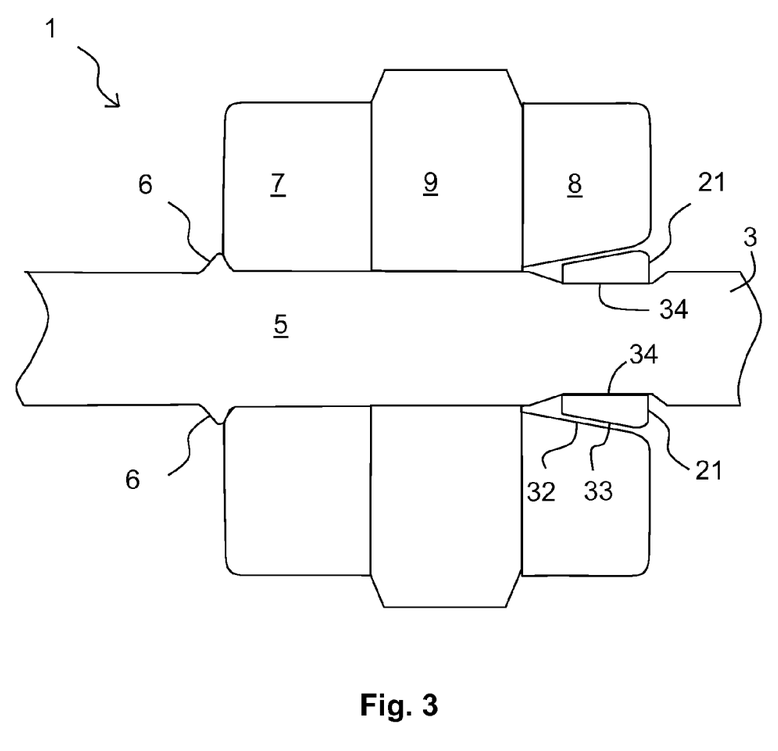
FIG. 3 is an enlarged cross-section of the end of the roll.

FIG. 3 shows an enlarged cross-section of an end 3 of the roll 1. The inner end plate 7 and outer end plate 8 sandwich the pulling flat 9. The inner end plate 7 is adjacent to an abutment 6. The outer end plate 8 includes an inclined inner surface 32 with a diameter that increases towards the end 3.

An outer retainer 21 includes a surface 34 with a diameter greater than that of the body 5 and a surface 33 complementarily engaging the inner surface 32 of the outer end plate 8. The outer retainer 21 defines a wedge-shaped cross-section. Driving the outer retainer 21 inwards from the end 3 produces a frictional fit that secures the outer end plate 8 to the roll 1. The outer retainer 21 may comprise a ring or may include a plurality of portions dispersed around the body. A ring may be a single unit; however, a split ring facilitates assembly of the roll and replacement of the pulling flat. The retainer ring 21 should comprise a hard refractory material and preferably should be non-dusting. The material may comprise fused silica. A refractory adhesive may also be used in conjunction with the retainer.

Figure 4:
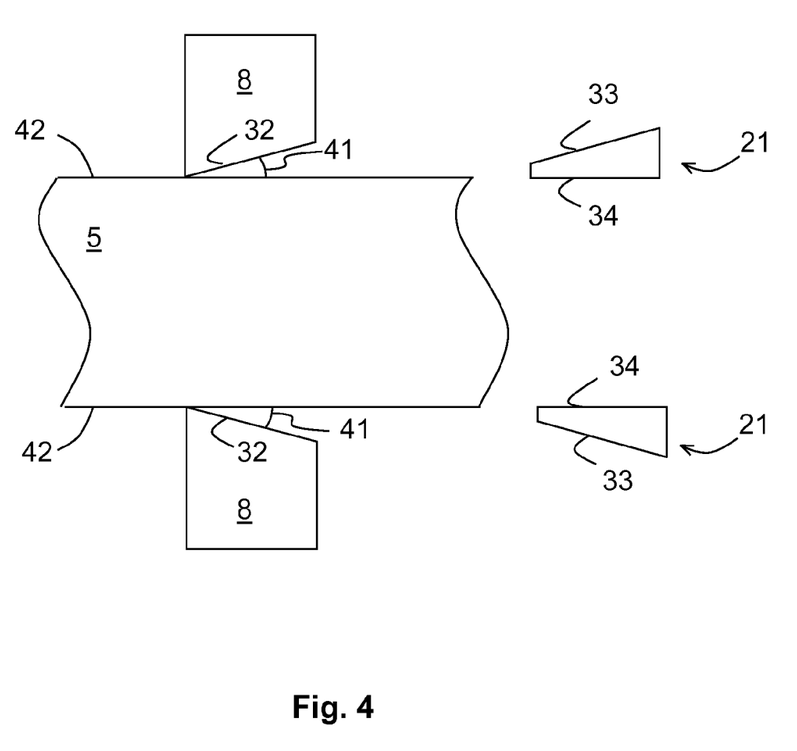
FIG. 4 is a cross-section of a second embodiment of the end of a roll.

As shown in FIG. 4, the inclined surface 32 will have an angle of inclination 41 from 5-25 degrees from the outer surface 42 of the body 5 of the roll. A smaller angle permits finer adjustment of the retaining force but demands tighter machining tolerances or a larger retainer ring. A larger angle accommodates larger mismatches between components but exerts a weaker retaining force and could loosen during use. Use of a retainer comprising a plurality of pieces, such as a split ring, facilitates assembly and permits the use of the mechanical fastening shown in FIG. 5.

The abutment is typically machined or cast into the body of the roll during is manufacture. Alternatively, the abutment may be mechanically or adhesively secured to the body. The abutment may even be replaced with a second retainer ring. In this embodiment, the inner end plate would include an inner surface that increases in diameter away from the end. The second retainer ring includes a first surface with a diameter greater than that of the body and a second surface complementarily engaging the inner surface of the inner end plate. The second retainer ring has a wedge-shaped cross-section. As assembled, the inner end plate/retainer ring could be substantial mirror images of the outer end plate/retainer ring.

Figure 6:
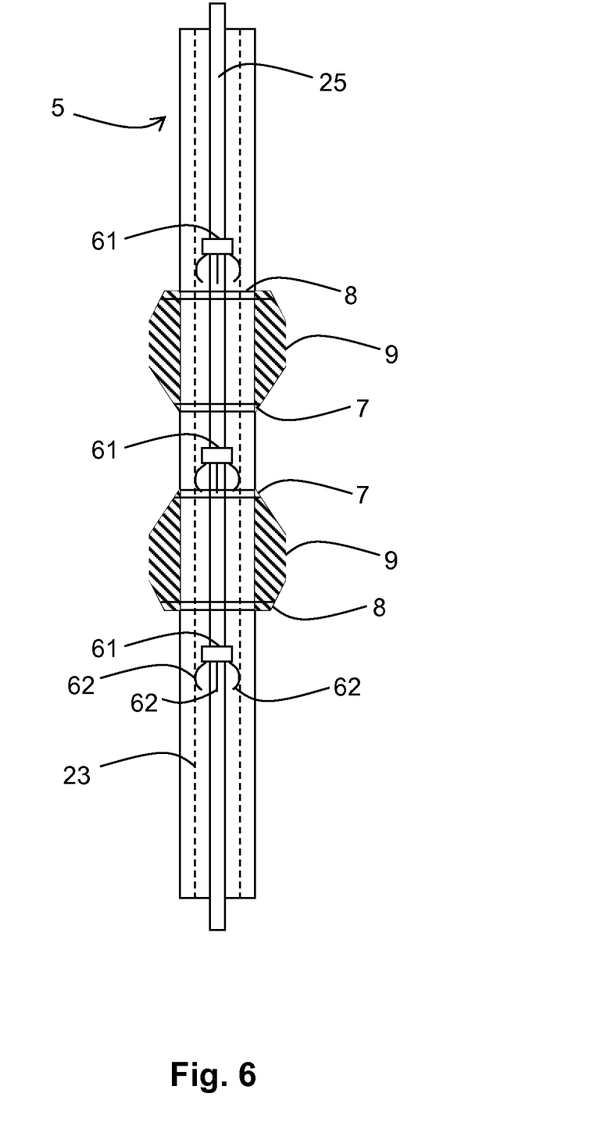
FIG. 6 is a perspective view of the metal rod, body and supports.

The body of the roll comprises fused silica. Because fused silica is susceptible to cracking, a metal rod may extend through the cavity of the roll. The metal rod may extend from end cap to end cap. Preferably, the metal rod does not impinge on the inner surface of the body. If the roll fractures during operation, the metal rod permits facile removal of the roll. A plurality of supports hold the metal rod along the longitudinal axis of the roll so that eccentricities of the roll are reduced. The metal rod will thermally expand more than the body of the roll. Direct contact of the metal rod on the inner surface of the body would produce a tensile stress in the body and could lead to fracture. The supports accommodate disparities in thermal expansion. The supports may comprise compressible refractory discs and may include refractory fiber. The discs accommodate thermal expansion of the metal rod by compressing, thereby transmitting a reduced stress to the inner surface of the body. Conveniently, the discs may include at least one passage that permits cooling air to pass through the cavity. Alternatively, the metal rod may be held in place using a plurality of collars. As shown in FIG. 6, a plurality of collars 61 can be welded to the metal rod 25. Each collar 61 includes a plurality of leaf springs 62 that align the metal rod 25 in the middle of the hollow body 5. The inner surface 23 of the body 5 compresses the leaf springs 62 thereby exerting a force on the metal rod 25 that resists movement.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed:

1. A roll for use in the manufacture of glass sheet comprising
    a hollow cylindrical body comprising silica and having an outer surface, an inner surface defining an interior cavity, a longitudinal axis and opposite ends along the longitudinal axis;
    a solid rod extending through the interior cavity, the rod having an exterior surface;
    a plurality of pulling flats consisting essentially of a non-dusting material;
    a plurality of inner end plates;
    and a plurality of outer end plates,
    wherein each pulling flat is sandwiched between an outer end plate and an inner end plate;
    wherein each outer end plate is secured to the body by an outer retainer and each inner end plate is secured to the body by an inner retainer,
    and wherein the inner surface of the roll and the outer surface of the rod define a coolant volume.

2. The roll of claim 1, wherein the outer retainer comprises a structure selected from the group consisting of: (a) having an inclined surface that complementarily engages an inner surface of the outer endplate and a second surface that engages a recess in the body, the recess having a discontinuity that restricts removal of the retainer from the recess, and (b) a compression fitting comprising fused silica.

3. The roll of claim 1, wherein the cylindrical body comprises fused silica.

4. The roll of claim 1, wherein the pulling flats have a Shore D hardness value in the range of 25 to 35.

5. The roll of claim 1, wherein the pulling flats comprise a non-dusting refractory ceramic.

6. The roll of claim 5, wherein the pulling flats comprise mica and clay.

7. The roll of claim 6, wherein the pulling flats comprise a heat-resistant binder.

8. The roll of claim 1, wherein the outer retainer comprises fused silica.

9. The roll of claim 1, wherein the ends are covered by an end cap fixedly secured to the body.

10. The roll of claim 9, wherein the end cap comprises metal.

11. The roll of claim 10, wherein the end cap is mechanically fixed to the body.

12. The roll of claim 1, wherein at least one plate mechanically supports a pulling flat.

13. The roll of claim 1, wherein the rod is engaged to the hollow cylindrical body by a plurality of supports.

14. The roll of claim 1, wherein the rod comprises metal.

* * * * *